US008378979B2

(12) United States Patent
Frid et al.

(10) Patent No.: US 8,378,979 B2
(45) Date of Patent: Feb. 19, 2013

(54) ELECTRONIC DEVICE WITH HAPTIC FEEDBACK

(75) Inventors: Marcos Frid, San Carlos, CA (US); Rajiv Kotesh Ghanta, Sunnyvale, CA (US); Joseph J. Hebenstreit, San Francisco, CA (US); John T. Kim, La Canada, CA (US)

(73) Assignee: Amazon Technologies, Inc., Reno, NV (US)

( * ) Notice: Subject to any disclaimer, the term of this patent is extended or adjusted under 35 U.S.C. 154(b) by 933 days.

(21) Appl. No.: 12/360,744

(22) Filed: Jan. 27, 2009

(65) Prior Publication Data

US 2010/0188327 A1    Jul. 29, 2010

(51) Int. Cl.
G06F 3/041 (2006.01)
G06F 3/02 (2006.01)
G09G 5/00 (2006.01)

(52) U.S. Cl. ......... 345/173; 345/156; 345/168; 345/169
(58) Field of Classification Search .................. 345/156, 345/168, 169, 173
See application file for complete search history.

(56) References Cited

U.S. PATENT DOCUMENTS

| 4,622,627 A | 11/1986 | Rodriguez et al. |
| 5,544,305 A | 8/1996 | Ohmaye et al. |
| 5,566,098 A | 10/1996 | Lucente et al. |
| 5,623,260 A | 4/1997 | Jones |
| 5,659,742 A | 8/1997 | Beattie et al. |
| 5,663,748 A | 9/1997 | Huffman et al. |
| 5,710,922 A | 1/1998 | Alley et al. |
| 5,742,905 A | 4/1998 | Pepe et al. |
| 5,761,485 A | 6/1998 | Munyan |
| 5,765,168 A | 6/1998 | Burrows |
| 5,813,017 A | 9/1998 | Morris |
| 5,845,278 A | 12/1998 | Kirsch et al. |
| 5,847,698 A | 12/1998 | Reavey et al. |
| 5,892,900 A | 4/1999 | Ginter et al. |
| 5,940,846 A | 8/1999 | Akiyama |
| 5,956,048 A | 9/1999 | Gaston |
| 5,960,411 A | 9/1999 | Hartman et al. |
| 5,973,681 A | 10/1999 | Tanigawa et al. |
| 6,018,575 A | 1/2000 | Gross et al. |
| 6,034,839 A | 3/2000 | Hamming |
| 6,037,954 A | 3/2000 | McMahon |

(Continued)

FOREIGN PATENT DOCUMENTS

| CN | 1362682 | 8/2002 |
| CN | 101120358 A | 2/2008 |

(Continued)

OTHER PUBLICATIONS

Card et al., "3Book: A 3D Electronic Smart Book," AVI'04, May 25-28, 2004, Hallipoli, Italy, ACM 2004, pp. 303-307.

(Continued)

Primary Examiner — My-Chau T Tran
(74) Attorney, Agent, or Firm — Lee & Hayes, PLLC

(57) ABSTRACT

Haptic feedback may be provided to a user of an electronic device, such as an electronic book reader device, to confirm receipt of user input or otherwise convey information to the user. The haptic feedback may be provided more quickly than a display update time of a display of the electronic device. Different patterns, durations, and/or intensities of haptic feedback may be used in response to different events.

25 Claims, 6 Drawing Sheets

U.S. PATENT DOCUMENTS

| | | | |
|---|---|---|---|
| 6,041,335 A | 3/2000 | Merritt et al. | |
| 6,047,189 A | 4/2000 | Yun et al. | |
| 6,049,796 A | 4/2000 | Siitonen et al. | |
| 6,064,980 A | 5/2000 | Jacobi et al. | |
| 6,073,148 A | 6/2000 | Rowe et al. | |
| 6,148,340 A | 11/2000 | Bittinger et al. | |
| 6,154,757 A | 11/2000 | Krause et al. | |
| 6,164,974 A | 12/2000 | Carlile et al. | |
| 6,201,771 B1 | 3/2001 | Otsuka et al. | |
| 6,233,318 B1 | 5/2001 | Picard et al. | |
| 6,300,947 B1 | 10/2001 | Kanevsky | |
| 6,308,320 B1 | 10/2001 | Burch | |
| 6,313,828 B1 | 11/2001 | Chombo | |
| 6,331,867 B1 | 12/2001 | Eberhard et al. | |
| 6,335,678 B1 | 1/2002 | Heutschi | |
| 6,351,750 B1 | 2/2002 | Duga et al. | |
| 6,385,596 B1 | 5/2002 | Wiser et al. | |
| 6,401,086 B1 | 6/2002 | Bruckner | |
| 6,401,239 B1 | 6/2002 | Miron | |
| 6,442,651 B2 | 8/2002 | Crow et al. | |
| 6,449,627 B1 | 9/2002 | Baer et al. | |
| 6,457,030 B1 | 9/2002 | Adams et al. | |
| 6,466,951 B1 | 10/2002 | Birkler et al. | |
| 6,493,734 B1 | 12/2002 | Sachs et al. | |
| 6,496,803 B1 | 12/2002 | Ho et al. | |
| 6,529,920 B1 | 3/2003 | Arons et al. | |
| 6,542,874 B1 | 4/2003 | Walker et al. | |
| 6,560,699 B1 | 5/2003 | Konkle | |
| 6,642,947 B2 | 11/2003 | Feierbach | |
| 6,658,623 B1 | 12/2003 | Schilit et al. | |
| 6,685,482 B2 | 2/2004 | Hopp et al. | |
| 6,687,878 B1 | 2/2004 | Eintracht et al. | |
| 6,704,733 B2 | 3/2004 | Clark et al. | |
| 6,721,869 B1 | 4/2004 | Senthil | |
| 6,724,403 B1 | 4/2004 | Santoro et al. | |
| 6,725,227 B1 | 4/2004 | Li | |
| 6,735,583 B1 | 5/2004 | Bjarnestam et al. | |
| 6,744,891 B1 | 6/2004 | Allen | |
| 6,847,966 B1 | 1/2005 | Sommer et al. | |
| 6,904,449 B1 | 6/2005 | Quinones | |
| 6,912,398 B1 | 6/2005 | Domnitz | |
| 6,933,928 B1 | 8/2005 | Lilienthal | |
| 6,938,076 B2 | 8/2005 | Meyer et al. | |
| 6,985,932 B1 | 1/2006 | Glaser et al. | |
| 6,999,565 B1 | 2/2006 | Delaney et al. | |
| 7,007,015 B1 | 2/2006 | Nayak | |
| 7,009,596 B2 | 3/2006 | Seet et al. | |
| 7,010,500 B2 | 3/2006 | Aarnio | |
| 7,020,654 B1 | 3/2006 | Najmi | |
| 7,054,914 B2 | 5/2006 | Suzuki et al. | |
| 7,057,591 B1 | 6/2006 | Hautanen et al. | |
| 7,062,707 B1 | 6/2006 | Knauft et al. | |
| 7,089,292 B1 * | 8/2006 | Roderick et al. | 709/217 |
| 7,092,116 B2 | 8/2006 | Calaway | |
| 7,103,848 B2 | 9/2006 | Barsness et al. | |
| 7,107,533 B2 | 9/2006 | Duncan et al. | |
| 7,130,841 B1 | 10/2006 | Goel et al. | |
| 7,133,506 B1 | 11/2006 | Smith | |
| 7,135,932 B2 | 11/2006 | Quadir et al. | |
| 7,149,776 B1 | 12/2006 | Roy et al. | |
| 7,165,217 B1 | 1/2007 | Kondo | |
| 7,188,085 B2 | 3/2007 | Pelletier | |
| 7,209,888 B2 | 4/2007 | Frid-Nielsen et al. | |
| 7,237,123 B2 | 6/2007 | LeVine et al. | |
| 7,246,118 B2 | 7/2007 | Chastain et al. | |
| 7,249,060 B2 | 7/2007 | Ling | |
| 7,249,324 B2 | 7/2007 | Nakamura et al. | |
| 7,257,577 B2 | 8/2007 | Fagin et al. | |
| 7,287,068 B1 | 10/2007 | Eriksson et al. | |
| 7,290,285 B2 | 10/2007 | McCurdy et al. | |
| 7,298,851 B1 | 11/2007 | Hendricks et al. | |
| 7,304,635 B2 | 12/2007 | Seet et al. | |
| 7,310,629 B1 | 12/2007 | Mendelson et al. | |
| 7,313,759 B2 | 12/2007 | Sinisi | |
| 7,350,704 B2 | 4/2008 | Barsness et al. | |
| 7,355,591 B2 | 4/2008 | Sugimoto | |
| 7,386,480 B2 | 6/2008 | Sarig | |
| 7,398,244 B1 | 7/2008 | Keith | |
| 7,401,286 B1 | 7/2008 | Hendricks et al. | |
| 7,454,238 B2 | 11/2008 | Vinayak et al. | |
| 7,496,767 B2 | 2/2009 | Evans | |
| 7,506,246 B2 | 3/2009 | Hollander et al. | |
| 7,509,270 B1 | 3/2009 | Hendricks et al. | |
| 7,533,152 B2 | 5/2009 | Stark et al. | |
| 7,539,478 B2 | 5/2009 | Herley et al. | |
| 7,562,032 B2 | 7/2009 | Abbosh et al. | |
| 7,574,653 B2 | 8/2009 | Croney et al. | |
| 7,631,013 B2 | 12/2009 | Parsons et al. | |
| 7,634,429 B2 | 12/2009 | Narin et al. | |
| 7,656,127 B1 | 2/2010 | Shutt et al. | |
| 7,657,459 B2 | 2/2010 | Anderson et al. | |
| 7,657,831 B2 | 2/2010 | Donahue | |
| 7,680,849 B2 | 3/2010 | Heller et al. | |
| 7,720,892 B1 | 5/2010 | Healey, Jr. et al. | |
| 7,760,986 B2 | 7/2010 | Beuque | |
| 7,788,369 B2 | 8/2010 | McAllen et al. | |
| 7,792,756 B2 | 9/2010 | Plastina et al. | |
| 7,835,989 B1 | 11/2010 | Hendricks et al. | |
| 7,849,393 B1 | 12/2010 | Hendricks et al. | |
| 7,865,405 B2 | 1/2011 | Hendricks et al. | |
| 7,865,567 B1 | 1/2011 | Hendricks et al. | |
| 7,870,022 B2 | 1/2011 | Bous et al. | |
| 7,900,133 B2 | 3/2011 | Cragun et al. | |
| 7,908,628 B2 | 3/2011 | Swart et al. | |
| 8,131,647 B2 | 3/2012 | Siegel et al. | |
| 8,165,998 B2 | 4/2012 | Semerdzhiev | |
| 2001/0007980 A1 | 7/2001 | Ishibashi et al. | |
| 2001/0025302 A1 | 9/2001 | Suzuki et al. | |
| 2001/0027450 A1 | 10/2001 | Shinoda et al. | |
| 2001/0027478 A1 | 10/2001 | Meier et al. | |
| 2001/0037328 A1 | 11/2001 | Pustejovsky et al. | |
| 2001/0049623 A1 | 12/2001 | Aggarwal et al. | |
| 2001/0053975 A1 | 12/2001 | Kurihara | |
| 2002/0002540 A1 | 1/2002 | DeMello et al. | |
| 2002/0010707 A1 | 1/2002 | Chang et al. | |
| 2002/0010759 A1 | 1/2002 | Hitson et al. | |
| 2002/0012134 A1 | 1/2002 | Calaway | |
| 2002/0035697 A1 | 3/2002 | McCurdy et al. | |
| 2002/0054059 A1 | 5/2002 | Schneiderman | |
| 2002/0059415 A1 | 5/2002 | Chang et al. | |
| 2002/0069222 A1 | 6/2002 | McNeely | |
| 2002/0069312 A1 | 6/2002 | Jones | |
| 2002/0090934 A1 | 7/2002 | Mitchelmore | |
| 2002/0091584 A1 | 7/2002 | Clark et al. | |
| 2002/0092031 A1 | 7/2002 | Dudkiewicz et al. | |
| 2002/0101447 A1 | 8/2002 | Carro | |
| 2002/0103809 A1 | 8/2002 | Starzl et al. | |
| 2002/0120635 A1 | 8/2002 | Joao | |
| 2002/0123336 A1 | 9/2002 | Kamada | |
| 2002/0129012 A1 | 9/2002 | Green | |
| 2002/0138291 A1 | 9/2002 | Vaidyanathan et al. | |
| 2002/0143822 A1 | 10/2002 | Brid et al. | |
| 2002/0147724 A1 | 10/2002 | Fries et al. | |
| 2002/0184319 A1 | 12/2002 | Willner et al. | |
| 2002/0194474 A1 | 12/2002 | Natsuno et al. | |
| 2003/0009459 A1 | 1/2003 | Chastain et al. | |
| 2003/0018720 A1 | 1/2003 | Chang et al. | |
| 2003/0025731 A1 | 2/2003 | Chastain et al. | |
| 2003/0028395 A1 | 2/2003 | Rodgers et al. | |
| 2003/0040970 A1 | 2/2003 | Miller | |
| 2003/0046233 A1 | 3/2003 | Ara et al. | |
| 2003/0052928 A1 | 3/2003 | Williams | |
| 2003/0058265 A1 | 3/2003 | Robinson et al. | |
| 2003/0065642 A1 | 4/2003 | Zee | |
| 2003/0069812 A1 | 4/2003 | Yuen et al. | |
| 2003/0093312 A1 | 5/2003 | Ukita et al. | |
| 2003/0093382 A1 | 5/2003 | Himeno et al. | |
| 2003/0097354 A1 | 5/2003 | Finlay et al. | |
| 2003/0105679 A1 | 6/2003 | Krishnan et al. | |
| 2003/0110503 A1 | 6/2003 | Perkes | |
| 2003/0129963 A1 | 7/2003 | Nurcahya | |
| 2003/0135495 A1 | 7/2003 | Vagnozzi | |
| 2003/0152894 A1 | 8/2003 | Townshend | |
| 2003/0163399 A1 | 8/2003 | Harper et al. | |
| 2003/0164844 A1 | 9/2003 | Kravitz et al. | |
| 2003/0182551 A1 | 9/2003 | Frantz et al. | |
| 2003/0190145 A1 | 10/2003 | Copperman et al. | |

| | | |
|---|---|---|
| 2003/0191737 A1 | 10/2003 | Steele et al. |
| 2003/0204496 A1 | 10/2003 | Ray et al. |
| 2003/0212613 A1 | 11/2003 | Sarig |
| 2004/0002943 A1 | 1/2004 | Merrill et al. |
| 2004/0003398 A1 | 1/2004 | Donian et al. |
| 2004/0015467 A1 | 1/2004 | Fano |
| 2004/0030686 A1 | 2/2004 | Cardno et al. |
| 2004/0044723 A1 | 3/2004 | Bell et al. |
| 2004/0054499 A1 | 3/2004 | Starzyk et al. |
| 2004/0078757 A1 | 4/2004 | Golovchinsky et al. |
| 2004/0098350 A1 | 5/2004 | Labrou et al. |
| 2004/0117189 A1 | 6/2004 | Bennett |
| 2004/0128359 A1 | 7/2004 | Horvitz et al. |
| 2004/0139400 A1 | 7/2004 | Allam et al. |
| 2004/0167822 A1 | 8/2004 | Chasen et al. |
| 2004/0201633 A1 | 10/2004 | Barsness et al. |
| 2004/0205457 A1 | 10/2004 | Bent et al. |
| 2004/0212941 A1 | 10/2004 | Haas et al. |
| 2004/0237033 A1 | 11/2004 | Woolf et al. |
| 2004/0243613 A1 | 12/2004 | Pourheidari |
| 2004/0267552 A1 | 12/2004 | Gilliam et al. |
| 2004/0268253 A1 | 12/2004 | DeMello et al. |
| 2005/0021464 A1 | 1/2005 | Lindauer et al. |
| 2005/0022113 A1 | 1/2005 | Hanlon |
| 2005/0044148 A1 | 2/2005 | Son et al. |
| 2005/0044224 A1 | 2/2005 | Jun et al. |
| 2005/0066219 A1 | 3/2005 | Hoffman et al. |
| 2005/0069225 A1 | 3/2005 | Schneider et al. |
| 2005/0088410 A1 | 4/2005 | Chaudhri |
| 2005/0102618 A1 | 5/2005 | Naito |
| 2005/0125222 A1 | 6/2005 | Brown et al. |
| 2005/0138007 A1 | 6/2005 | Amitay |
| 2005/0138428 A1 | 6/2005 | McAllen et al. |
| 2005/0144895 A1 | 7/2005 | Grimes et al. |
| 2005/0176438 A1 | 8/2005 | Li |
| 2005/0177567 A1 | 8/2005 | Hughes et al. |
| 2005/0193330 A1 | 9/2005 | Peters |
| 2005/0195975 A1 | 9/2005 | Kawakita |
| 2005/0198070 A1 | 9/2005 | Lowry |
| 2005/0222977 A1 | 10/2005 | Zhou et al. |
| 2005/0250439 A1 | 11/2005 | Leslie |
| 2005/0256822 A1 | 11/2005 | Hollingsworth |
| 2006/0004840 A1 | 1/2006 | Senda |
| 2006/0020469 A1 | 1/2006 | Rast |
| 2006/0031316 A1 | 2/2006 | Forstadius |
| 2006/0047830 A1 | 3/2006 | Nair et al. |
| 2006/0048184 A1 | 3/2006 | Poslinski et al. |
| 2006/0057960 A1 | 3/2006 | Tran |
| 2006/0061595 A1 | 3/2006 | Goede et al. |
| 2006/0071754 A1 | 4/2006 | Tofts et al. |
| 2006/0075205 A1 | 4/2006 | Martin et al. |
| 2006/0080261 A1 | 4/2006 | Christal |
| 2006/0098900 A1 | 5/2006 | King et al. |
| 2006/0101328 A1 | 5/2006 | Albornoz et al. |
| 2006/0123053 A1 | 6/2006 | Scannell |
| 2006/0129618 A1 | 6/2006 | Maier |
| 2006/0143558 A1 | 6/2006 | Albornoz et al. |
| 2006/0156222 A1 | 7/2006 | Chi et al. |
| 2006/0161635 A1 | 7/2006 | Lamkin et al. |
| 2006/0175983 A1 | 8/2006 | Crouse et al. |
| 2006/0179137 A1 | 8/2006 | Jennings et al. |
| 2006/0190489 A1 | 8/2006 | Vohariwatt et al. |
| 2006/0190568 A1 | 8/2006 | Patterson |
| 2006/0236240 A1 | 10/2006 | Lebow |
| 2006/0250994 A1 | 11/2006 | Sasaki et al. |
| 2006/0253441 A1 | 11/2006 | Nelson |
| 2006/0253461 A1 | 11/2006 | de Bonet |
| 2006/0253463 A1 | 11/2006 | Rosenberg |
| 2006/0265518 A1 | 11/2006 | Owens et al. |
| 2006/0281058 A1 | 12/2006 | Mangoaela |
| 2007/0014404 A1 | 1/2007 | Cha |
| 2007/0025704 A1 | 2/2007 | Tsukazaki et al. |
| 2007/0039023 A1 | 2/2007 | Kataoka |
| 2007/0050346 A1 | 3/2007 | Goel et al. |
| 2007/0061335 A1 | 3/2007 | Ramer et al. |
| 2007/0073596 A1 | 3/2007 | Alexander et al. |
| 2007/0079383 A1 | 4/2007 | Gopalakrishnan |
| 2007/0094285 A1 | 4/2007 | Agichtein et al. |
| 2007/0094351 A1 | 4/2007 | Kalish et al. |
| 2007/0105536 A1 | 5/2007 | Tingo |
| 2007/0112817 A1 | 5/2007 | Danninger |
| 2007/0118533 A1 | 5/2007 | Ramer et al. |
| 2007/0136660 A1 | 6/2007 | Gurcan et al. |
| 2007/0136679 A1 | 6/2007 | Yang |
| 2007/0150456 A1 | 6/2007 | Lian et al. |
| 2007/0174545 A1 | 7/2007 | Okada et al. |
| 2007/0185865 A1 | 8/2007 | Budzik et al. |
| 2007/0189719 A1 | 8/2007 | Furumachi et al. |
| 2007/0219983 A1 | 9/2007 | Fish |
| 2007/0233562 A1 | 10/2007 | Lidwell et al. |
| 2007/0233692 A1 | 10/2007 | Lisa et al. |
| 2007/0234209 A1 | 10/2007 | Williams |
| 2007/0282809 A1 | 12/2007 | Hoeber et al. |
| 2007/0283173 A1 | 12/2007 | Webb et al. |
| 2007/0288853 A1 | 12/2007 | Neil |
| 2008/0005097 A1 | 1/2008 | Kleewein et al. |
| 2008/0005664 A1 | 1/2008 | Chandra |
| 2008/0027933 A1 | 1/2008 | Hussam |
| 2008/0031595 A1 | 2/2008 | Cho |
| 2008/0040233 A1 | 2/2008 | Wildman et al. |
| 2008/0082518 A1 | 4/2008 | Loftesness |
| 2008/0082911 A1 | 4/2008 | Sorotokin et al. |
| 2008/0089665 A1 | 4/2008 | Thambiratnam et al. |
| 2008/0113614 A1 | 5/2008 | Rosenblatt |
| 2008/0120280 A1 | 5/2008 | Iijima et al. |
| 2008/0133479 A1 | 6/2008 | Zelevinsky et al. |
| 2008/0163039 A1 | 7/2008 | Ryan et al. |
| 2008/0164304 A1 | 7/2008 | Narasimhan et al. |
| 2008/0168073 A1 | 7/2008 | Siegel et al. |
| 2008/0208833 A1 | 8/2008 | Basmov |
| 2008/0222552 A1 | 9/2008 | Batarseh et al. |
| 2008/0235351 A1 | 9/2008 | Banga et al. |
| 2008/0243788 A1 | 10/2008 | Reztlaff, II et al. |
| 2008/0243828 A1 | 10/2008 | Reztlaff, II et al. |
| 2008/0259057 A1 | 10/2008 | Brons |
| 2008/0293450 A1 | 11/2008 | Ryan et al. |
| 2008/0294674 A1 | 11/2008 | Reztlaff, II et al. |
| 2008/0295039 A1 | 11/2008 | Nguyen et al. |
| 2009/0094528 A1 | 4/2009 | Gray et al. |
| 2009/0094540 A1 | 4/2009 | Gray et al. |
| 2009/0181649 A1 | 7/2009 | Bull et al. |
| 2009/0228774 A1 | 9/2009 | Matheny et al. |
| 2009/0263777 A1 | 10/2009 | Kohn |
| 2009/0319482 A1 | 12/2009 | Norlander et al. |
| 2010/0023259 A1 | 1/2010 | Krumm et al. |
| 2010/0081120 A1 | 4/2010 | Nanjiani et al. |
| 2010/0188327 A1 | 7/2010 | Frid et al. |
| 2012/0041941 A1 | 2/2012 | King et al. |

FOREIGN PATENT DOCUMENTS

| | | |
|---|---|---|
| EP | 1842150 A2 | 10/2007 |
| JP | 2002099739 A | 4/2002 |
| WO | WO9720274 | 6/1997 |
| WO | WO0045588 | 8/2000 |
| WO | WO0056055 A2 | 9/2000 |
| WO | WO0075840 A2 | 12/2000 |
| WO | WO0239206 | 5/2002 |
| WO | WO2004055647 A2 | 7/2004 |
| WO | WO2006078728 A2 | 7/2006 |

OTHER PUBLICATIONS

Translated Japanese Office Action mailed Oct. 25, 2011 for Japanese patent application No. 2007-552235, a counterpart foreign application of U.S. Appl. No. 11/039,645, 3 pages.

Mercier et al., "Sphere of influence Model in Information retrieval," IEEE 2005 International Conference on Fuzzy Systems, pp. 120-125.

Final Office Action for U.S. Appl. No. 11/537,484, mailed on Jan. 24, 2012, Thomas A. Ryan, "Expedited Acquisition of a Digital Item Following a Sample Presentation of the Item," 22 pages.

Final Office Action for U.S. Appl. No. 12/414,914, mailed on Jan. 4, 2012, Agarwal et al., "Questions on Highlighted Passages," 41 pages.

Office action for U.S. Appl. No. 11/763,357, mailed on Dec. 21, 2011, Retzlaff et al., "Obtaining and Verifying Search Indices," 14 pages.

Final Office Action for U.S. Appl. No. 11/763,363, mailed on Dec. 23, 2011, James R. Retzaff II et al., "Search Results Generation and Sorting," 10 pages.

Non-Final Office Action for U.S. Appl. No. 11/763,369, mailed on Dec. 29, 2011, James R. Retzlaff II et al., "Search of Multiple Content Sources on a User Device," 21 pages.
Final Office Action for U.S. Appl. No. 11/693,685, dated Dec. 8, 2011, John Lattyak et al., "Relative Progress and Event Indicators," 23 pages.
PCT Search Report for PCT Application No. PCT/US10/22060, mailed Mar. 8, 2010 (7 pages).
Cavanaugh, "EBooks and Accommodations," Teaching Exceptional Children, vol. 35, No. 2, Copyright 2002 CEC, 6 pages.
Final Office Action for U.S. Appl. No. 11/763,314, mailed on Jun. 13, 2011, Craig S. Griffin, "Display Dependent Markup Language," 26 pages.
Non-Final Office Action for U.S. Appl. No. 11/693,682, mailed on Jun. 9, 2011, Hilliard B. Siegel, "Providing Annotations of a Digital Work," 12 pages.
Office action for U.S. Appl. No. 12/333,215, mailed on Jul. 18, 2011, Zagorie et al., "Device-Specific Presentation Control for Electronic Book Reader Devices", 22 pages.
Non-Final Office Action for U.S. Appl. No. 11/693,685, mailed on Jul. 6, 2011, John Lattyak, "Relative Progress and Event Indicators," 22 pages.
Office action for U.S. Appl. No. 12/414,914, mailed on Aug. 4, 2011, Agarwal et al., "Questions on Highlighted Passages," 39 pages.
BarnesandNoble.com, "Barnes and Noble Homepage," retrieved on Aug. 2, 2011 at <<http://web.archive.org/web/19981202183957/http://www.barnesandnoble.com/>>, Dec. 2, 1998, 2 pages.
Translated Chinese Office Action mailed Jul. 14, 2011 for Japanese patent application No. 20078004873.9, a counterpart foreign application of US patent No. 7,865,817, 6 pages.
Translated Chinese Office Action mailed Aug. 25, 2011 for Chinese patent application No. 200880024964.2, a counterpart foreign application of US patent application No. 11/763,358, 6 pages.
Non-final Office Action for U.S. Appl. No. 11/537,484, mailed on Aug. 19, 2011, Thomas A. Ryan, "Expedited Acquisition of a Digital Item Following a Sample Presentation of the Item," 13 pages.
Non-final Office Action for U.S. Appl. No. 11/763,363, mailed on Aug. 26, 2011, James R. Retzlaff II, "Search Results Generation and Sorting," 10 pages.
Non-Final Office Action for U.S. Appl. No. 11/763,358, mailed on Sep. 12, 2011, James R. Retzlaff II, "Managing Status of Search Index Generation," 11 pages.
Cafesoft.com, "Security Glossary", dated Oct. 13, 2003, retrieved from the Wayback Machine on Jul. 2, 2009 at <<http://web.archive.org/web/20031013022218/http://cafesoft.com/support/security-glossary.html>>, 6 pages.
Translated Chinese Office Action mailed Oct. 10, 2011 for Chinese patent application No. 200880017259.X, a counterpart foreign application of U.S. Appl. No. 11/693,682, 7 pages.
Translated Chinese Office Action mailed Sep. 26, 2011 for Chinese patent application No. 200880017589.9, a counterpart foreign application of U.S. Appl. No. 11/763,369, 9 pages.
Translated Chinese Office Action mailed Sep. 30, 2011 for Chinese patent application No. 200880025056.5, a counterpart foreign application of U.S. Appl. No. 11/763,374, 9 pages.
Office action for U.S. Appl. No. 12/360,089, mailed on Oct. 5, 2011, Killalea et al., "Aggregation of Highlights," 75 pages.
Final Office Action for U.S. Appl. No. 11/763,392, mailed on Oct. 14, 2011, Thomas Ryan, "Administrative Tasks a Media Consumption System," 38 pages.
Office action for U.S. Appl. No. 11/763,390, mailed on Oct. 24, 2011, Bajaj et al., "Providing User-Supplied Items to a User Device," 11 pages.
Final Office Action for U.S. Appl. No. 12/759,828, mailed on Nov. 10, 2011, James R. Retzalff II, "Search and Indexing on a User Device," 16 pages.
Final Office Action for U.S. Appl. No. 11/537,518, mailed on Nov. 25, 2011, John Lattyak, "Acquisition of an Item Based on a Catalog Presentation of Items," 8 pages.
Non-Final Office Action for U.S. Appl. No. 11/763,386, mailed on Nov. 8, 2011, Thomas Ryan, "Handling of Subscription-Related Issues in a Media Consumption System," 10 pages.

Non-Final Office Action for U.S. Appl. No. 11/763,395, mailed on Nov. 9, 2011, Thomas Ryan, "Providing Supplemental Information Based on Hints in a Media Consumption System," 10 pages.
Final Office Action for U.S. Appl. No. 11/963,618, mailed on Sep. 26, 2011, Michael Rykov, "Dissemination of Periodical Samples," 15 pages.
Non-Final Office Action for U.S. Appl. No. 11/763,374, mailed on Sep. 27, 2011, Thomas Ryan, "Consumption of Items via a User Device," 17 pages.
Beigbeder, et al., "An Information Retrieval Model Using the Fuzzy Proximity Degree of Term Occurences", 2005 ACM Symposium on Applied Computing, pp. 1018-1022.
Biskup, et al, "Towards a Credential-Based Implementation of Compound Access Control Policies" SACMAT '04, Proceedings of the ninth ACM symposium on Access control models and technologies, Jun. 4, 2004, NY, retrieved from the internet http://portal.acm.org/citation.cfm?id=990036.990042>>, retrieved Nov. 9, 2010, pp. 1-10.
Breu, et al., "The Medoc Distributed Electronic Library: Accounting and Security Aspects", Electronic Publishing, New Models and Opportunities, Proceedings of an ICCC/IFIP Conference, Apr. 14, 1997, pp. 237-249.
Gladney, "Access Control for Large Collections", NY, vol. 15, No. 2, Apr. 1, 1997, pp. 154-194.
Henke, "Survey on Electronic Book Features", Open eBook Forum, online, Mar. 20, 2002, pp. 1-14, retrieved from the internet http://www.openebook.org/doc_library/surveys/IDPF_eBook_Features_2002.pdf>> retrieved Nov. 8, 2010.
Navarro, et al., "Modern Information Retrieval, Chapter 8: Indexing and Searching", Jan. 1, 1999, Modern Information Retrieval, ACM Press, New York, pp. 191-228.
Ziviani, et al., "Modern Information Retrieval, Text Operations", Jan. 1, 1999, Modern Information Retrieval, ACM Press, NY, pp. 163-190.
Zobel, et al., "Inverted Files for Text Search Engines" ACM Computing Surveys, vol. 38, No. 2, Jul. 1, 2006, pp. 1-56, NY, NY.
Final Office Action for U.S. Appl. No. 11/763,374, mailed on Feb. 13, 2012, Thomas Ryan et al., "Consumption of Items via a User Device", 14 pages.
Non-Final Office Action for U.S. Appl. No. 11/763,393, mailed on Feb. 16, 2012, John Lattyak et al., "Incremental Updates of Items", 24 pages.
Final Office Action for U.S. Appl. No. 12/360,089, mailed on Mar. 28, 2012, Tom Killalea et al., "Aggregation of Highlights", 17 pages.
Non-Final Office Action for U.S. Appl. No. 12/366,941, mailed on Mar. 30, 2012, Scott Dixon et al., "Bundled Digital Content", 12 pages.
Non-Final Office action for U.S. Appl. No. 11/693,682, mailed on Apr. 23, 2012, Siegel et al., "Providing Annotations of a Digital Work", 12 pages.
Final Office Action for U.S. Appl. No. 11/763,386, mailed on Apr. 26, 2012, Thomas Ryan et al., "Handling of Subscription-Related Issues in a Media Consumption System", 14 pages.
Non-Final Office Action for U.S. Appl. No. 13/083,445, mailed on May 4, 2012, Hilliard B. Siegel et al., "Method and System for Providing Annotations of a Digital Work", 20 pages.
Desmoulins et al., "Pattern-Based Annotations on E-books: From Personal to Shared Didactic Content", Proceedings of the IEEE International Workshop on Wireless and Mobile Techniques in Education, 2002, 4 pages.
Canadian Office Action mailed Jul. 6, 2012 for Canadian patent application No. 2594573, a counterpart foreign application of U.S. Appl. No. 8,131,647, 5 pages.
Final Office Action from the U.S. Patent and Trademark Office for U.S. Appl. No. 11/763,378, mailed on Mar. 16, 2010, 16 pgs.
Office Action from the U.S. Patent and Trademark Office for U.S. Appl. No. 11/763,375, mailed on Jan. 19, 2010, 31 pgs.
Office Action from the U.S. Patent and Trademark Office for U.S. Appl. No. 11/763,378, mailed on Oct. 15, 2009, 31 pgs.
Office Action from the U.S. Patent and Trademark Office for U.S. Appl. No. 11/763,375, mailed on Aug. 6, 2010, 17 pgs.
Bradley, "Plastic Shape Shifter", retreived on May 7, 2009 at <<http://www.reactivereports.com/61/61_3.html>>, Chemistry WebMagazine, Issue No. 61, Dec. 2006, 2 pgs.

Cavanaugh "EBooks and Accommodations", Teaching Expectional Children vol. 35 No. 2 p. 56-61 Copyright 2002 CEC, pp. 56-61.
Chi et al. "eBooks with Indexes that Reorganize Conceptually", CHI2004, Apr. 24-29, 2004, Vienna, Austria ACM 1-58113-703-6/04/0004, pp. 1223-1226.
Davison et al. "The Use of eBooks and Interactive Multimedia, as Alternative Forms of Technical Documentation" SIGDOC'05, Sep. 21-23, 2005, Conventry, United Kingdom, Copyright 2005 ACM 1-59593-175-9/5/0009, pp. 108-115.
Elspass, et al., "Portable Haptic Interface with Active Functional Design", In Proceedings SPIE Conference on Smart Structures and Integrated Systems, Newport Beach, California, vol. 3668, Mar. 1999, 926-932.
"Haptic History—Machine Haptics (Expansion)" retrieved on May 7, 2009 at <<http://hapticshistory.chc61.uci.cu/haptic/site/pages/Machine-Haptics-Became_5.php.>> from Google's cache, text-only version as webpage appeared on Apr. 16, 2009, 8 pgs.
Jones, et al., "Development of a Tactile Vest", IEEE Computer Society, In the Proceedings of the 12th International Symposium on Haptic Interfaces for Virtual Environment and Teleoperator Systems, Mar. 27-28, 2004, pp. 82-89.
Leutwyler, "Shape-shifting Polymer Gels", retrieved on May 7, 2009 at <<http://www.scientificamerican.com/article.cfm?id=shape-shifting-polymer-ge&print=true>>, Scientific American, Nov. 9, 2000, 1 pg.
Nakatani, et al., "3D Form Display with Shape Memory Alloy", In Proceedings of 13th International Conference on Artificial Reality and Teleexistence (ICAT), 2003, pp. 179-184.
"Shape Memory Polymer", retrieved on May 7, 2009 at <<http://en.wikipedia.org/wiki/Shape_Memory_Polymer>>, Wikipedia, 8 pgs.
Sohn et al. "Development of a Standard Format for eBooks", SAC2002, Madrid, Spain, 2002 ACM 1-58113-445-2/02/0, pp. 535-540.
Wellman, et al., "Mechanical Design and Control of a High-Bandwidth Shape Memory Alloy Tactile Display", Springer-Verlag, In the Proceedings of the International Symposium on Experimental Robotics, Barcelona, Spain, Jun. 1997, pp. 56-66, 12 pgs.
Yoshikawa, et al., "Vertical Drive Micro Actuator for Haptic Display Using Shape Memory Alloy Thin Film", IEE Japan, Papers of Technical Meeting on Micromachine and Sensor System, Journal Code L2898B, vol. MSS-05, No. 21-44, 2005, pp. 103-108.
Cleveland, Jr. et al., "Questions and Answers about Biological Effects and Potential Hazards of Radiofrequency Electromagnetic Fields" OET Bulletin 56, Fourth Edition, Aug. 1999, 38 pages.
Cleveland, Jr., et al, "Evaluating Compliance with FCC Guidelines for Human Exposure to Radiofrequency Electromagnetic Fields" OET Bulletin 65, Edition 97-01, Aug. 1997, 84 pages.
Means, et al., "Evaluating Compliance with FCC Guidelines for Human Exposure to Radiofrequency Electromagnetic Fields", OET Bulletin 65 Edition 97-01, Jun. 2001, 57 pages.
OQO "A Full PC That Fits in Your Pocket" Retrieved on Sep. 22, 2008 at <<http://www.oqo.com/support/documentation.html>>.
PCT Search Report for International Application No. PCT/US 07/89105, mailed Aug. 18, 2008 (4 pages).
PCT Search Report for International Application No. PCT/US 08/57829, mailed Aug. 15, 2008 (2 pages).
PCT Search Report and Written Opinion for International Application No. PCT/US 08/64387, mailed Sep. 9, 2008 (14 pages).
PCT Search Report for International Application No. PCT/US 08/64368, mailed Sep. 22, 2008 (2 pages).
PCT Search Report and Written Opinion for International Application No. PCT/US 08/64389, mailed Jan. 28, 2009 (7 pages).
PCT Search Report and Written Opinion for International Application No. PCT/US 08/57848, mailed Jul. 7, 2008 (9 pages).
Translated Chinese Office Action mailed May 17, 2012 for Chinese patent application No. 20078004873.9, a counterpart foreign application of U.S. Appl. No. 7,865,817, 5 pages.
Translated Chinese Office Action mailed May 21, 2012 for Chinese patent application No. 200880017589.9, a counterpart foreign application of U.S. Appl. No. 11/763,369, 9 pages.
Final Office Action for U.S. Appl. No. 11/763,395, mailed May 9, 2012, Thomas Ryan et al., "Providing Supplemental Information Based on Hints in a Media Consumption System ", 12 pages.

Office action for U.S. Appl. No. 11/763,390, mailed on Jun. 27, 2012, Bajaj et al., "Providing User-Supplied Items to a User Device", 7 pages.
Office action for U.S. Appl. No. 11/763,392, mailed on Jun. 27, 2012, Ryan et al., "Administrative Tasks in a Media Consumption System ", 47 pages.
Non-Final Office Action for U.S. Appl. No. 12/943,211, mailed on Jun. 6, 2012, James. R. Retzlaff II et al., "Obtaining and Verifying Search Indices", 10 pages.
Non-Final Office Action for U.S. Appl. No. 11/763,369 mailed on Jun. 7, 2012, James R. Reztlaff II et al., "Search of Multiple Content Sources on a User Device", 20 pages.
"Annotation Engine," Berkman Center for Internet & Society at Harvard Law School, retrieved on Jan. 30, 2004 at <<http://cyber.law.harvard. edulproj ectsl annotate.html>>, 3 pages.
"Annotator Instructions," Berkman Center for Internet & Society at Harvard Law School retrieved on Jan. 30, 2004 at <<http://cyber.law.harvard.edu/annotate/instructions.html>>, also found at <<http://cyber.law.harvard.edu/cite/instructions.html>>, 1 page.
"Annotator Wishlist," Berkman Center for Internet & Society at Harvard Law School retrieved on Jan. 30, 2004 at <<http://cyber.law.harvard.edulcite/annotate.cgi ?ction=print&markup ;center=; view=http%3A%2F%2Fcy . . . >>, 1 page.
Roscheisen et al., "Beyond Browsing: Shared Comments, SOAPs, Trails, and On-Line Communities," Computer Networks and ISDN Systems 27:739- 749, 1995, 12 pages.
Canadian Office Action mailed Apr. 14, 2009 for Canadian Patent Application No. 2594573, a counterpart foreign application of U.S. Appl. No. 11/039,645, 3 pages.
Translated Chinese Office Action mailed May 9, 2008 for Chinese Patent Application No. 200680002606.2, a counterpart foreign application of U.S. Appl. No. 11/039,645, 22 pages.
Translated Chinese Second Office Action mailed Jun. 5, 2009 for Chinese Patent Application No. 200680002606.2, a counterpart foreign application of U.S. Appl. No. 11/039,645, 20 pages.
Translated Chinese Third Office Action mailed Nov. 27, 2009 for Chinese Patent Application No. 200680002606.2, a counterpart foreign application of U.S. Appl. No. 11/039,645, 15 pages.
Carter et al., "Digital Graffiti: Public Annotation of Multimedia Content," Proceedings of the CHI2004, Vienna, Austria, Apr. 24-29, 2004, pp. 1207-1210.
Extended European Search Report mailed Dec. 22, 2009, issued in corresponding European Patent Application No. EP 06 71 8773.2, filed Jan. 18, 2006, 9 pages.
European Office Action mailed Mar. 26, 2010 for European Patent Application No. 06718773.2, a counterpart foreign application of U.S. Appl. No. 11/039,645, 1 page.
Translated Japanese Office Action mailed Jan. 25, 2011 for Japanese Patent Application No. 2007-552235, a counterpart foreign application of U.S. Appl. No. 11/039,645, 6 pages.
Non-Final Office Action for U.S. Appl. No. 11/537,518, mailed on Apr. 28, 2011, John Lattyak, "Acquisition of an Item Based on a Catalog Presentation of Items," 26 pages.
Office action for U.S. Appl. No. 11/763,357, mailed on May 26, 2011, Retzlaff, "Obtaining and Verifying Search Indices," 21 pages.
International Search Report mailed Sep. 9, 2008, in International Application No. PCT/US/08/64387, filed May 21, 2008, 1 page.
International Search Report mailed Aug. 15, 2008, in corresponding International Application No. PCT/US08/57829, filed Mar. 21, 2008, 1 page.
International Search Report mailed Jul. 7, 2008, in International Application No. PCT/US08/57848, filed Mar. 31, 2008, 2 pages.
PCT International Search Report and the Written Opinion for Application No. PCT/US 08/64389, mailed on Jan. 28, 2009, 7 pages.
"Say NO to Third Voice," Worldzone.net, 1999-2004, retrieved on Jan. 30, 2004 at <<http://worldzone.netiinternetipixelsnttv/index.html>>, 3 pages.
Marshall, "The Future of Annotation in a Digital (Paper) World," Proceedings of the 35th Annual GSLIS Clinic, University of Illinois at Urbana Champaign, Urbana, 11, Mar. 22-24, 1998, pp. 1-19.
Kumar, "Third Voice Trails off . . .," Wired News, 2004, retrieved on Jan. 30, 2004 at <<http://www.wired.comlnews/printIO. 1294, 42803 ,00.html>>, 3 pages.

"A Universally Unique IDentifier (UUID) URN Namespace", Jul. 2005, IETF, 32 pages. Retrieved on Apr. 21, 2010 at http://tools.iettorg/pdf/r1c4122.pdf.

Bellwood, et al., "UDDI Version 2.04 API Specification UDDI Committee Specification, Jul. 19, 2002", Oasis, 95 pages. Retrieved on Apr. 21, 2010 via Wayback Machine at http://web.archive.org/web/20050314033213/www.oasis-open.org/committees/uddi-spec/doc/tcspecs.htm.

"Universal Unique Identifier", dated Dec. 16, 2002. The Open Group, 9 pages. Retrieved on Apr. 21, 2010 via Wayback Machine at http://web.archive.org/web/20021216070918/http://www.opengroup.org/onlinepubs/9629399/apdxa.htm.

"Web Services Architecture: W3C Working Group Note Feb. 11, 2004", Feb. 11, 2004, W3C, 100 pages. Retrieved on Apr. 21, 2010 via Wayback Machine at http://web.archive.org/web/2004040205185/http://www.w3.org/TR/ws-arch/.

Translated Chinese Office Action mailed Aug. 3, 2012 for Chinese patent application No. 200880025056.5, a counterpart foreign application of U.S. Appl. No. 11/763,374, 17 pages.

Final Office Action from the U.S. Patent and Trademark Office for U.S. Appl. No. 12/414,914, mailed on Jan. 4, 2012, 16 pgs.

* cited by examiner

LIST OF HAPTIC PROFILES 400

| | EVENT 402 | HAPTIC SIGNATURE 404 | SOUND 406 |
|---|---|---|---|
| 1. | HIGHLIGHT AN OBJECT | SIGNATURE 1 | AUDIO FILE 1 |
| 2. | SELECT AN OBJECT | SIGNATURE 2 | AUDIO FILE 6 |
| 3. | TURN A PAGE | SIGNATURE 3 | AUDIO FILE 3 |
| 4. | OPEN A MENU | SIGNATURE 4 | AUDIO FILE 6 |
| 5. | DELETE AN ITEM | SIGNATURE 5 | AUDIO FILE 5 |
| 6. | INVOKE A SEARCH | SIGNATURE 6 | NONE |
| 7. | CLIP TEXT | SIGNATURE 7 | AUDIO FILE 7 |
| 8. | ACTIVATE A LINK | SIGNATURE 8 | NONE |
| 9. | LOW BATT WARNING | SIGNATURE 9 | AUDIO FILE 4 |
| ... | ... | ... | ... |
| N. | OTHER EVENT | SIGNATURE N | AUDIO FILE 8 |

FIG. 4

ELECTRONIC DEVICE WITH HAPTIC FEEDBACK

BACKGROUND

Portable electronic devices, such as gaming devices, mobile telephones, portable media players, portable digital assistants (PDAs), electronic book (eBook) reader devices, and the like, are becoming increasingly popular. These devices often include a screen for visually conveying information to a user. Users of such portable electronic devices can provide input via a user interface to, for example, select an object or text on the screen. This user input is typically manifest visually on the screen (e.g., by highlighting the text or object), thereby providing the user with feedback confirming that the user input was received and processed. In devices employing a cathode ray tube (CRT) display, a liquid crystal display (LCD), or other display with a relatively short display update time, the user receives this visual confirmation almost immediately after providing the input.

However, in devices employing a display with a longer display update time, such as an electronic paper display, there may be a perceptible delay between when a user provides input and when that input is visually displayed on the screen. This delay can be confusing to a user, because they are not sure whether the device registered their input. Some electronic devices have attempted to mitigate this uncertainty by providing an audible confirmation of the user input, such as by playing a sound effect in response to receipt of user input. However, users may not associate the sound with the action they just input. Also, sound may not be able to adequately convey prolonged inputs, such as selection of a string of text.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 4 is a schematic diagram showing a list of illustrative haptic profiles usable to provide different haptic feedback responses.

DETAILED DESCRIPTION

Overview

Figure 1:
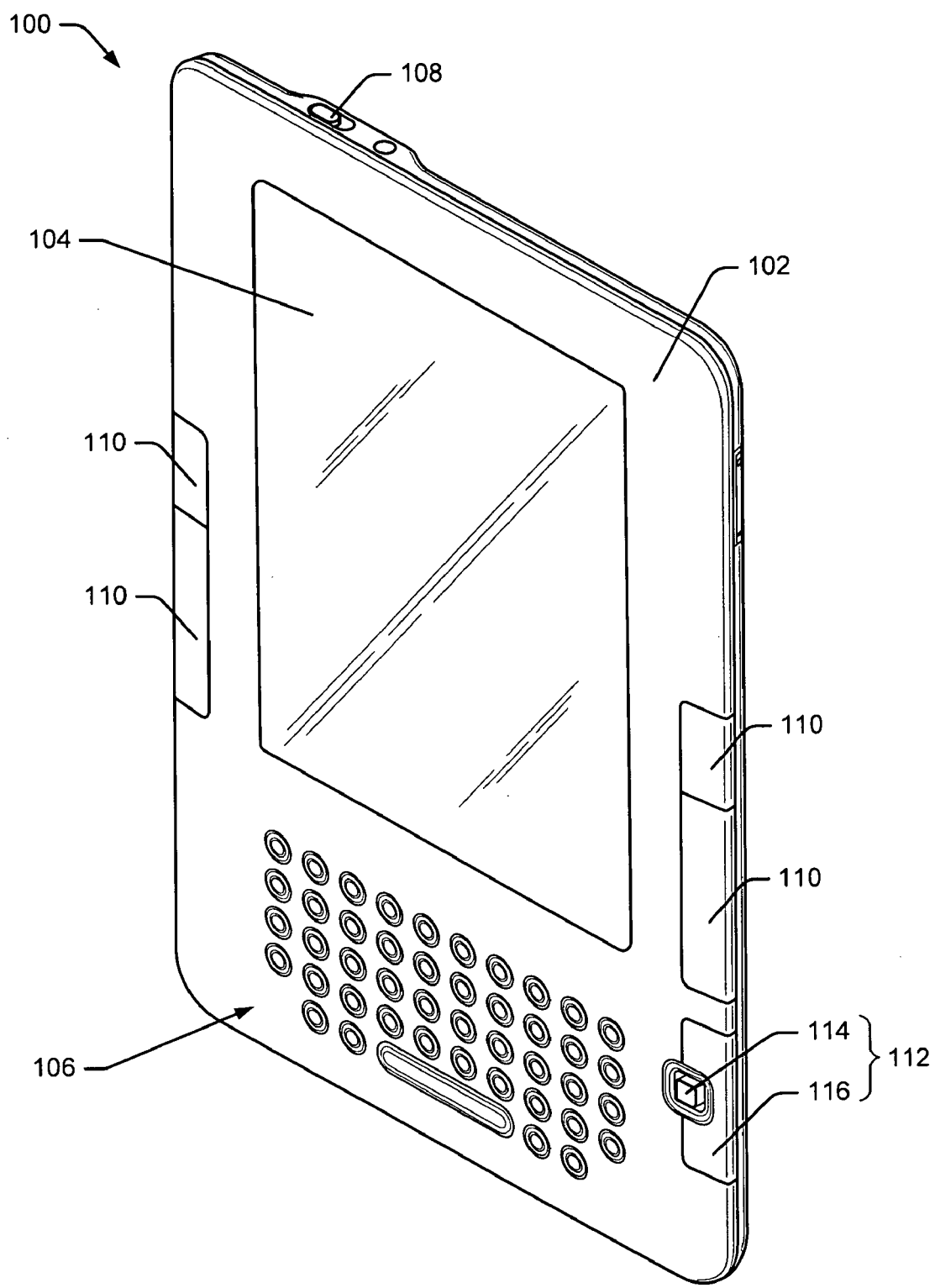
FIG. 1 is a schematic diagram of an illustrative electronic device, in the form of an electronic book (eBook) reader device, that may implement haptic feedback techniques described herein.

As discussed above, for electronic devices employing a display with a relatively long display update time (e.g., update times of at least about 15 milliseconds), such as an electronic paper display, there may be a perceptible delay between when a user provides input and when that input is visually presented on the display. This delay can be confusing to a user, because they are unsure whether the device registered their input. As used herein "display update time" refers to the time it takes to update or refresh data displayed on a display screen. Display update time may include a full display frame update, in which all or substantially all of the data displayed on a display screen is refreshed, or a partial display frame update, in which only a portion (e.g., a menu or other localized region) of the display screen is refreshed.

This disclosure describes various illustrative techniques for providing haptic feedback to a user of an electronic device, such as an electronic book (eBook) reader device, to confirm receipt of user input, to notify the user of a system event, or otherwise convey information to the user. Haptic feedback refers to feedback imparted to the user via the sense of touch (e.g., by applying forces, vibrations and/or motions to the user). In at least some implementations, the haptic feedback may be provided more quickly than a display update time of the electronic device.

In some implementations, different patterns, durations, and/or intensities of haptic feedback may be used. These different patterns, durations, and/or intensities of haptic feedback are referred to herein as "haptic signatures." Different haptic signatures may be applied to different events. The haptic signature used for each event may be chosen to simulate a real world activity. For example, user input event to highlight a string of text may be met by a haptic signature characterized by constant, low amplitude vibration, to simulate the sensation of dragging an actual highlighter across a piece of paper.

In some implementations, the haptic feedback may be accompanied by audible feedback. For example, in the case of highlighting a string of text, the electronic device may also play a sound representative of dragging a highlighter across a piece of paper, further enhancing the user experience.

Haptic feedback may be provided in response to, among other things, user input via a button, joystick, knob, thumb wheel, lever, touch screen, or other user interface mechanism. The haptic feedback may be provided in response to all or only a subset of user inputs. Additionally or alternatively, haptic feedback may be provided in response to other non-user input related events, such as system events and program events.

While haptic feedback techniques are described in the context of portable electronic devices having displays with relatively long display update times, such as electronic paper displays, the haptic feedback techniques described herein are also applicable to devices having displays with shorter display update times. In that case, the haptic feedback may be provided substantially contemporaneously with visual feedback. Moreover, while the techniques are described in the context of portable electronic devices, the techniques are also applicable to other electronic devices, such as laptop and desktop computers, set-top-boxes, game consoles or controls, televisions, appliances, audio/video equipment, and the like.

EXAMPLE ELECTRONIC DEVICE

FIG. 1 shows an example of one illustrative electronic device 100 capable of providing haptic feedback to a user. In the illustrated implementation, the device 100 is embodied as a handheld electronic book (eBook) reader device. However, virtually any other type of electronic device may be used and may be configured to provide haptic feedback to a user as described herein. By way of example and not limitation, other electronic devices that could be configured to employ the haptic feedback techniques described herein include gaming devices, mobile telephones, portable media players, portable digital assistants (PDAs), personal computers (desktop and laptop), netbooks, electronic book reader devices, set-top-boxes, televisions, appliances, audio/video equipment, and the like.

As shown in FIG. 1, the eBook reader device 100 has a body or housing 102, a display 104 for displaying information to a user, and a user interface. In this example, the display 104 comprises an electronic paper display, such as those made by eInk Corporation of Cambridge, Mass. The user interface comprises a variety of mechanism for users to interact with the device 100 including a keypad 106, an on/off slider 108, multiple buttons 110, and a user interface cluster 112 including a joystick 114 and a pivot button 116. In some implementations, the display 104 may also comprise a user interface mechanism in the form of a touch screen.

The user interface allows users to, among other actions, display and navigate through a collection of eBooks, web pages, audio files, video files, games, programs, and/or other electronic items. As used herein, the term eBook includes electronic copies of books, magazines, newspapers, maps, publications, and other at least partially text-based electronic documents. Users may also be able to select, highlight, and/or modify text or other items on the display. Users may be able to compose email or other items, perform searches of locally stored and/or remote information, browse the internet, or the like. Users may also be able to manage the content stored on the device to download or install new items and/or delete existing items. These and other actions are possible using the various user input mechanisms of the user interface.

In the illustrated eBook reader device 100, the keypad 106 includes a plurality of alphabetic, numeric, and/or function keys for entry of user input. The on/off slider 108, as its name suggests, allows users to selectively turn at least some systems of the device 100 on or off. However, power to some systems of the device may be controlled independently of the on/off switch. Buttons 110 allow users to turn pages forward and back within an eBook and go to a home page. The joystick 114 allows users to select text and items on the display. Pivot button 116 allows users to open menus and undo selections.

In other implementations, user interfaces of electronic devices may include any combination of these and other user input mechanisms. Other user inputs that may be present include, for example, scroll wheels, thumb wheels, thumb sticks, sensors that detect and register movement of a user's thumb or finger, tactile sensors, touch screens, or any other conventional user input mechanism.

Using an electronic paper screen as the display 104 reduces the power consumption of the electronic device 100, thereby extending battery life. Electronic paper displays also provide a very easy to read display that resembles an actual printed page of text. However, as mentioned above, electronic paper displays tend to have a longer display update time than other types of displays, such as cathode ray tube (CRT) displays and liquid crystal displays (LCDs). For example, electronic paper displays may have a display update time greater than about 15 milliseconds. Typically, electronic paper displays have display update times greater than about 100 milliseconds, and in some implementations, displays may have display update times greater than about 250 milliseconds.

With display update times greater than about 15 milliseconds, there is a perceptible delay between a time when a user requests an action via the user interface and a time when that action is displayed on the display 104. This delay may cause users to be uncertain whether the electronic device received an input. In some instances, users unsure about whether their input was received may reenter their input several times, possibly resulting in multiple and/or unintended actions being performed by the electronic device 100. Haptic feedback may be used to confirm the user's input more quickly, thereby removing any uncertainty in the mind of the user about whether an input was received. The haptic feedback may be provided more quickly than the display update times of the display 104; for example, in less than about 15 milliseconds in most cases.

Illustrative Electronic Device Subsystems

In addition to the exterior components shown in FIG. 1, the eBook reader device 100 also has various internal components, which are referred to generally as eBook reader subsystems 200. In one implementation, the subsystems 200 include memory 202 and a processing unit 204. The processing unit 204 interacts with the memory 202 to facilitate operation of the eBook reader device 100. The memory 202 may be used to store content 206, such as eBooks, audio and/or video media, or the like. The memory 202 also includes software programs or other executable modules 208 that may be executed by the processing unit 204. Examples of such programs or modules include indexing modules for indexing content, reader programs, control modules (e.g., power management), network connection software, an operating system, display drivers, sensor algorithms, page turn detectors, and the like.

The eBook reader subsystems 200 also include a haptic feedback device 210 to provide haptic feedback in response to user input or other events. In various implementations, the haptic feedback device 210 may be configured to apply haptic feedback in the form of vibration, force feedback, and/or motion, depending on the specific type of haptic feedback device used. An audio output 212 may also be provided as an eBook reader subsystem to provide audible feedback in response to user input or other events. The haptic feedback device 210 and the audio output 212 may be used separately or in concert to enhance users' experiences by providing feedback to a user of the device 100.

The memory 202 may also store one or more haptic profiles 214 that define different patterns, durations, and/or intensities of haptic feedback to be used in response to different user inputs or other events. These different patterns, durations, and/or intensities of haptic feedback are referred to herein as "haptic signatures." The haptic signature used for each event may be chosen to simulate a real world activity to provide a realistic user experience.

A haptic device driver 216 is provided to drive the haptic feedback device 210 according to one or more of the haptic profiles 214. In one specific example, the haptic device driver 216 may comprise a simple drive circuit, with a single n-doped filed effect transistor (NFET) used to switch the haptic feedback device 210 on and off. The circuit may have a low-side switch configuration. A Schottky diode may be placed across the haptic feedback device 210, to protect against inductive kick-back.

While the haptic device driver 216 is illustrated and described as a drive circuit, in other implementations, the haptic device driver 216 could alternatively be configured as a software module stored in memory 202 or as firmware.

The memory 202 may include volatile memory (such as RAM), nonvolatile memory, removable memory, and/or non-removable memory, implemented in any method or technology for storage of information, such as computer-readable instructions, data structures, program modules, or other data. Also, the processing unit 204 may include onboard memory in addition to or instead of the memory 202. Some examples of storage media that may be included in the memory 202 and/or processing unit 204 include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by the eBook reader device 100. Any such computer-readable media may be part of the eBook reader device 100.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processing unit 204, as hardware, and/or as firmware. Typically, the functionality of the program modules may be combined or distributed as desired in various embodiments. An implementation of these modules and techniques may be stored on or transmitted across some form of computer-readable media.

EXAMPLE HAPTIC FEEDBACK MECHANISMS

Figure 3:
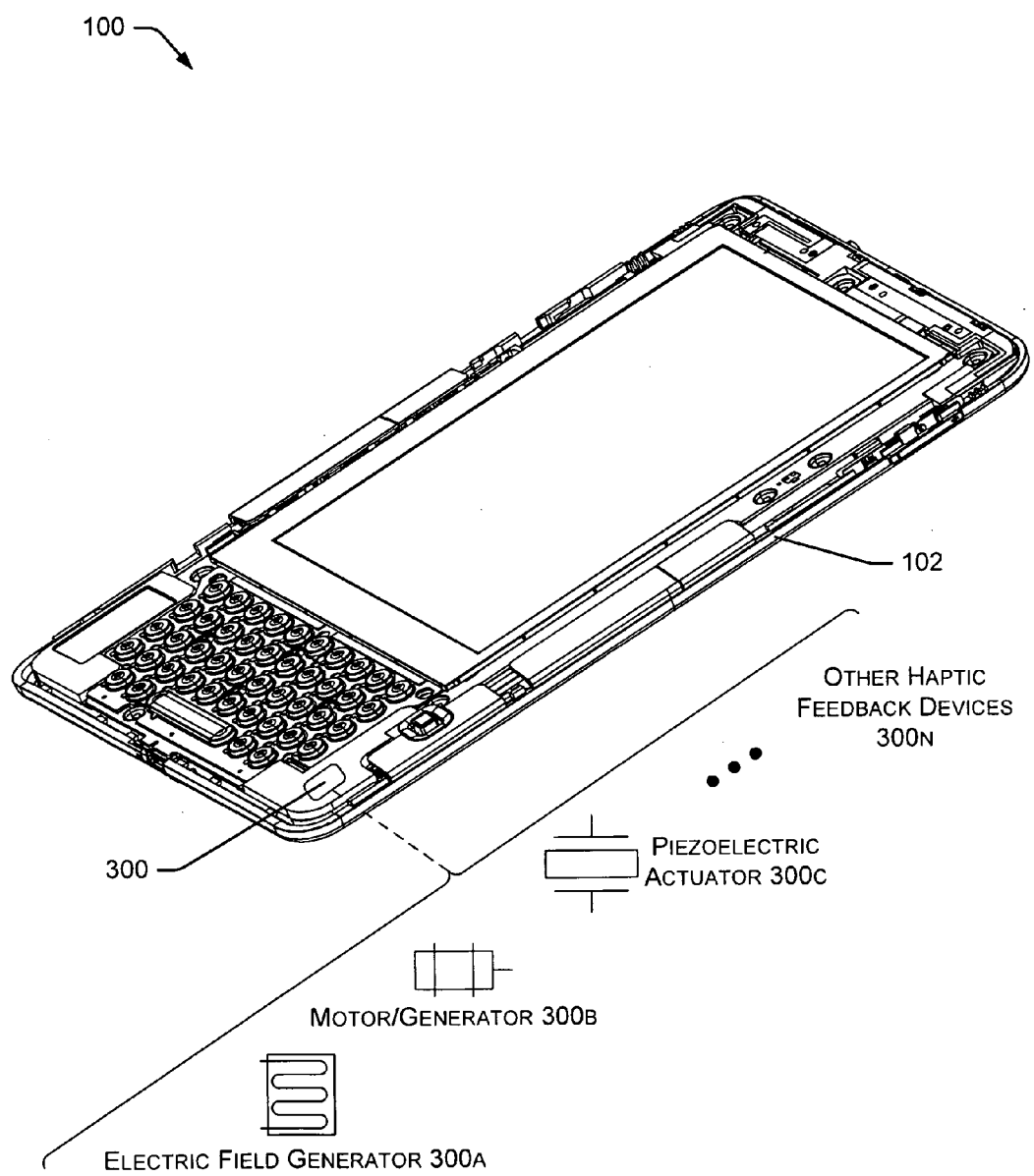
FIG. 3 is a schematic diagram showing illustrative haptic feedback devices usable with the eBook reader device of FIG. 1 to implement the haptic feedback techniques described herein.

FIG. 3 is a diagram of the eBook reader device 100 with the front cover removed to schematically show an illustrative haptic feedback device 300 usable to provide haptic feedback. In this implementation, one surface of the haptic feedback device 300 is affixed to a sub-frame of the back of the housing 102 of the electronic device 100 to impart the haptic feedback to the back of the housing 102. An opposite face and remaining surfaces of the haptic feedback device 300 may be encapsulated in rubber, or other damping material, to help isolate the vibrations to the housing 102. Thus, haptic feedback may be imparted to the housing 102 of the device 100 in response to user input or other events.

In other implementations, the haptic feedback device 300 may be coupled to a particular user input device of the user interface, such that the haptic feedback is localized to the particular user input device. For example, the haptic feedback device could be coupled to any of the display 104, keypad 106, on-off slider 108, buttons 110, joystick 114, and/or pivot button 116 of the user interface. Moreover, multiple haptic feedback devices could be provided, with different haptic feedback devices coupled to different user inputs. In this manner, haptic feedback could be applied independently to each of the user input mechanisms of the user interface.

Various different haptic feedback mechanisms may be used as the haptic feedback device 300. In one implementation, the haptic feedback device comprises an electric field generator 300A, a magnetic mass (not shown) disposed therein. The electric field generator 300A is selectively activatable to drive the mass to generate a vibration. More specifically, the electric field generator 300A comprises a two-lead cylindrical device. The leads are connected to opposite ends of a coil, similar to a voice coil found in a speaker. Applying a voltage across the coil generates an electromagnetic field that attracts or repels the magnetic mass inside, thus producing mechanical vibrations from electrical drive signals provided by the haptic feedback device driver 216. The electric field generator 300A haptic feedback device has a mechanical resonance (i.e., a specific frequency at which it produces strong vibrations). A roll-off from this peak resonance is sharp on both sides (in the frequency domain). Thus, an intensity of the haptic feedback provided can be adjusted by adjusting a frequency at which the electric field generator 300A is driven.

In another implementation, the haptic feedback device 300 comprises an unbalanced rotatable mass and a motor 300B to drive the unbalanced rotatable mass. As the motor 300B spins, the unbalanced mass creates a vibration that can be used to apply haptic feedback.

In yet another implementation, the haptic feedback device 300 comprises a piezoelectric actuator 300C. Piezoelectric actuators take advantage of the ability of some materials (notably crystals and certain ceramics) to generate an electric potential in response to applied mechanical stress, and conversely to deform when an electric field is applied. Thus, a piezoelectric actuator 300C may serve the dual purpose of registering user input by emitting a signal when the actuator is deformed (e.g., a button is depressed, a joystick is moved, or a wheel is turned), as well as providing haptic feedback by deforming when an electric field is applied thereto. In some implementations, the piezoelectric actuator 300C may be used in combination with an electric field generator, such as electric field generator 300A, to create the electric field to cause the piezoelectric actuator to deform. Additionally or alternatively, the piezoelectric actuator may take the form of a piezoelectric motor.

In some implementations, the haptic feedback device 300 may be configured to provide haptic feedback in the form of vibration applied to the housing 102 and/or one or more user input mechanisms (104-116). However, in other implementations, haptic feedback devices could be configured additionally or alternatively to apply force feedback (i.e., resistive force or pushback on one or more user input mechanisms) or motion feedback (i.e., physical motion of one or more user input mechanisms). For example, the motor 300B could be used to apply resistive force and/or motion feedback to one or more user mechanisms (e.g., a thumb wheel, dial, knob, or other rotatable user input mechanism) of the user interface. With a suitable mechanical linkage, the motor 300B could apply resistive force and/or motion feedback to non-rotatable user input mechanisms as well.

These and other types of haptic feedback devices 300N may be used alone or in combination with one or more force transmission mechanisms, such as one or more levers or linkages, a pin-rod matrix, or the like, to generate haptic feedback in accordance with this disclosure. Several examples of other haptic feedback devices 300N that may be used to implement the techniques described herein include shape memory alloys (SMAs) or shape memory polymers (SMPs). By way of example and not limitation, several illustrative examples of SMAs that could be used include nickel-titanium compositions, Bio Metal Fiber and Bio Metal Helix series of materials, available from Toki Corporation of Tokyo, Japan. Also by way of example and not limitation, several illustrative examples of SMPs that could be used include N-isopropylacrylamide (NIPAM), methacryloyl chloride (MACL) which contains poly(epsilon-caprolactone) (PCL) segments and poly(cyclohexyl methacrylate) (PCHMA) segments, or the like.

EXAMPLE HAPTIC PROFILES

As discussed above, in at least some implementations, haptic feedback is applied according to a haptic signature specified in a haptic profile 214 stored in memory 202 of the electronic device 100. The haptic signature specifies the different pattern, duration, and/or intensity of haptic feedback to apply for a given event. The haptic profiles 214 define which haptic signature to use for various events.

FIG. 4 is a schematic diagram showing an illustrative list 400 of haptic profiles 214 stored in memory 202 of the electronic device 100. A haptic profile 214 exists for at least some and possibly all possible user input events. By way of example and not limitation, user input events that may have a haptic profile include highlighting an object, selecting an object, turning a page of an electronic item, opening a menu, deleting an item from memory, invoking a search, clipping an object, activating a link, among other events. In addition to user input events, other events, such as system events, program events, and the like, may also have corresponding haptic profiles to define a haptic signature to use upon the occurrence of the respective event.

For each haptic profile 214, the list 400 includes an event entry 402 specifying an event, and a haptic signature entry 404 to use upon occurrence of the specified event. In some implementations, the list 400 may also include a sound entry 406, designating a sound to play upon the occurrence of the specified event.

The first entry in the list 400 corresponds to an event in which a user highlights an object, such as a string of text. The haptic profile 214 for that entry specifies that the electronic device 100 is to apply haptic signature 1 and play audio file 1. If the electronic device 100 is configured to simulate a corresponding real world action, haptic signature 1 in this example may be reminiscent of the sensation of dragging a highlighter across a piece of paper and audio file 1 may be a recording of the sound of dragging a highlighter across a piece of paper. The combination of haptic and audible feedback further enhances the user experience.

The second through $m^{th}$ entries in the list may also include haptic signatures and/or audio clips to play in response to given events.

EXAMPLE HAPTIC SIGNATURES

Figure 5:
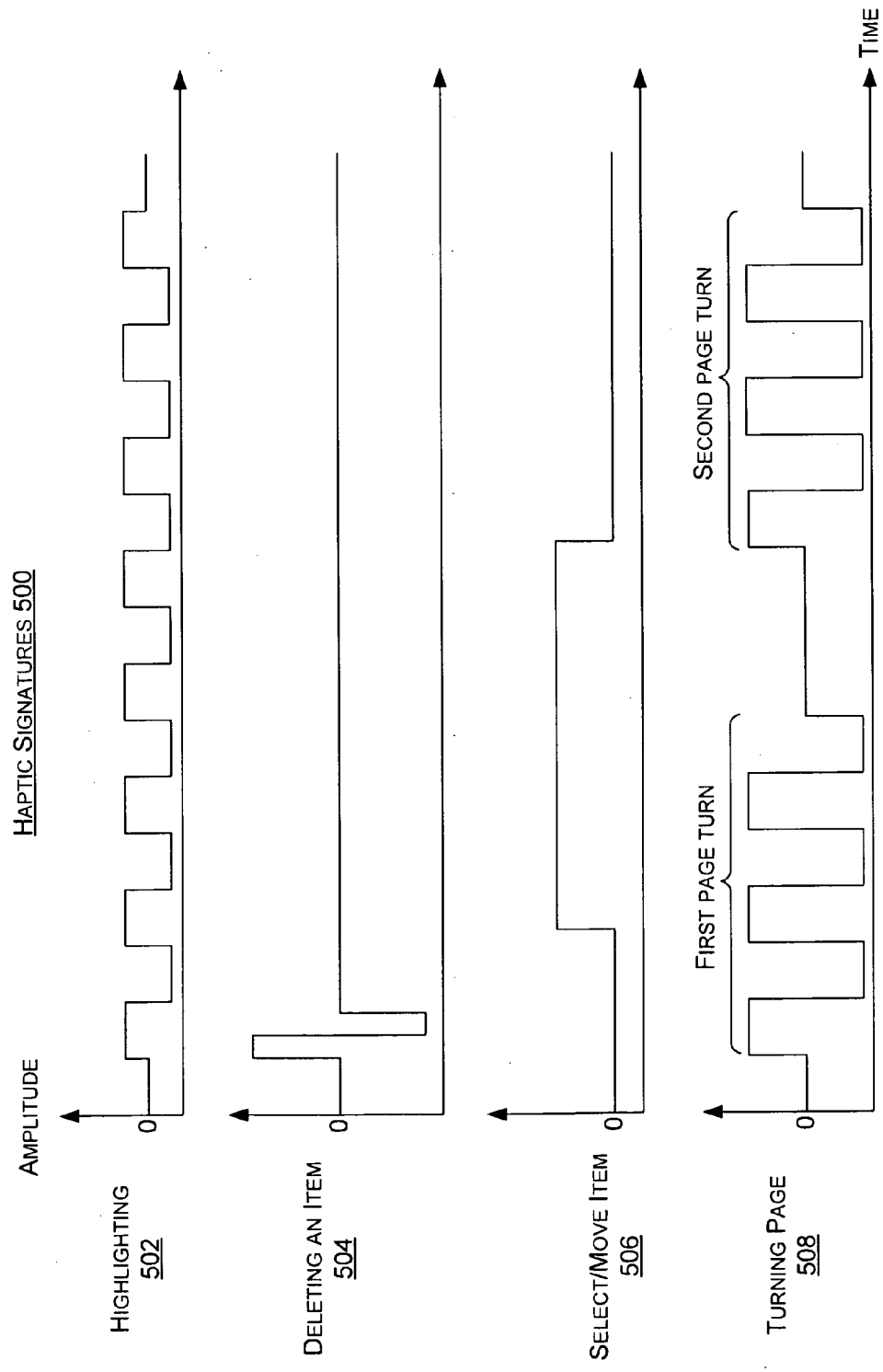
FIG. 5 is a schematic diagram graphically depicting four illustrative haptic signatures of different haptic feedback responses.

FIG. 5 is a graphical illustration of four example haptic signatures 400 that may be used in response to various events. As discussed above, the haptic signatures 400 may comprise vibration feedback, force feedback, and/or motion feedback. The haptic signatures 400 generally define a duration, amplitude, and pattern of haptic feedback provided.

A first haptic signature 402 is associated with user input to highlight an object, such as text. The highlighting haptic signature 402 is characterized by a relatively low amplitude, continuous vibration designed to simulate the physical act of dragging a highlighter across a piece of paper.

A second haptic signature 404 is associated with user input to delete an item from memory of the device. The delete haptic signature 404 is characterized by a relatively larger magnitude vibration of short duration designed to simulate a chopping sensation.

A third haptic signature 406 is associated with user input to select and/or move an item. The select/move haptic signature 406 is characterized by a positive force feedback of medium amplitude, designed to simulate the force necessary to lift or hold an object. The duration of the force corresponds to the length of time a user holds down a button, joystick or other user input mechanism to select or move the object.

A fourth haptic signature 408 is associated with user input to turn a page of a eBook, change a track of an album, or navigate within another digital item. The page-turn haptic signature 408 is characterized by a vibration pattern of three cycles of moderate amplitude for each page turn request. The page-turn haptic signature 408 is designed to simulate the sensation of flipping pages of a physical book. The page-turn haptic signature 408 shown in FIG. 5 is shown repeated a second time following a pause, indicating that the user has requested a second page turn.

The four foregoing haptic signatures are merely illustrative of haptic signatures that may be used for the corresponding events. However, other haptic signatures could be used in response to these events. Moreover, these or any number of other haptic signatures may be used in response to other events.

EXAMPLE OPERATION

Figure 2:
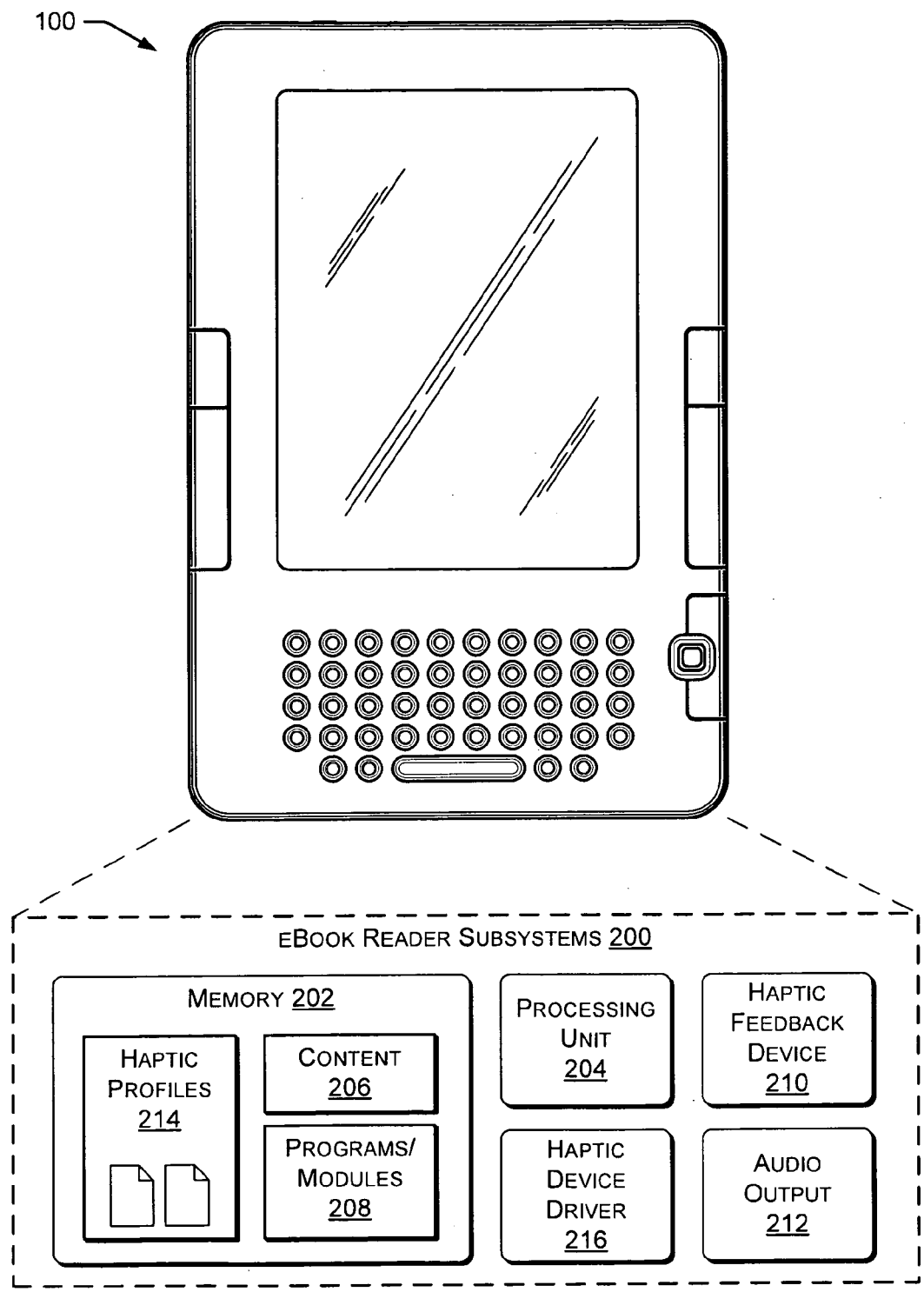
FIG. 2 is a schematic diagram of illustrative subsystems of the eBook reader device of FIG. 1.
Figure 6:
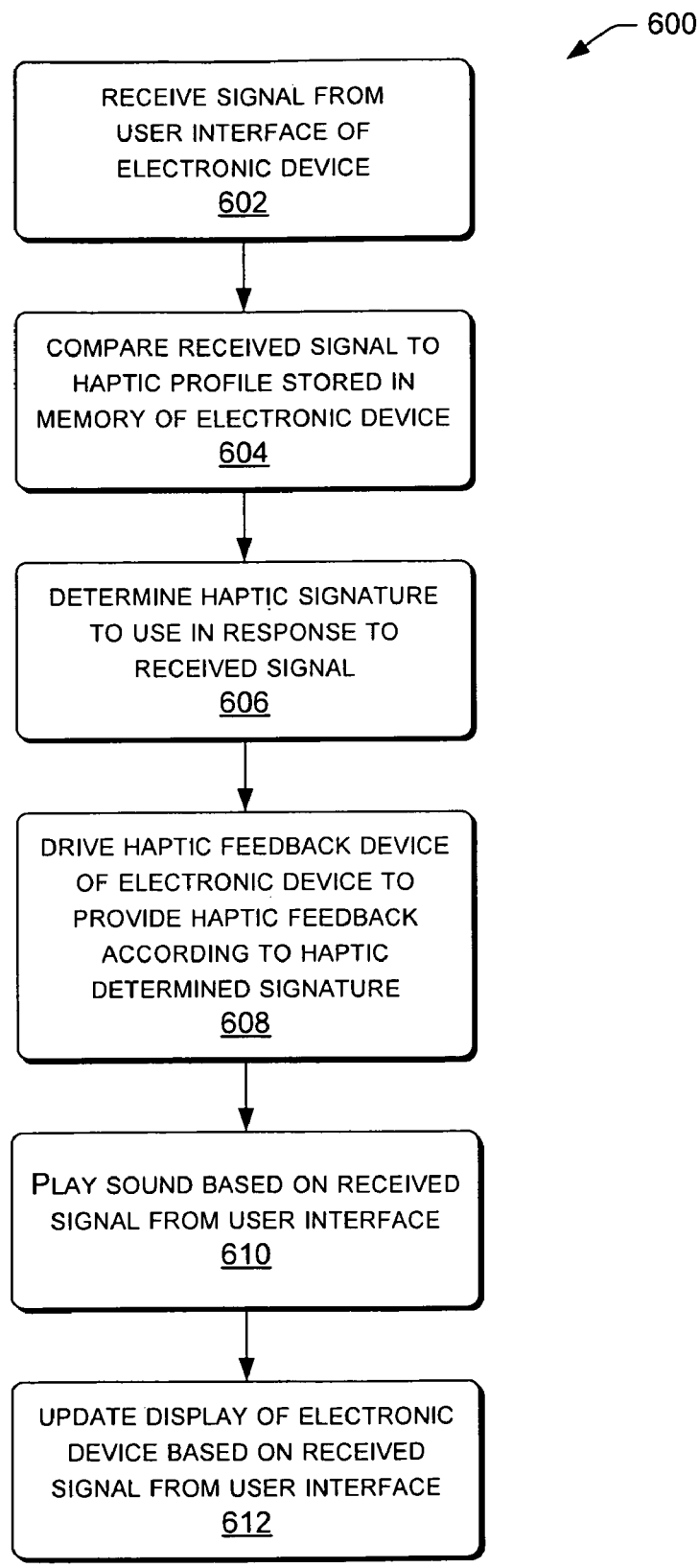
FIG. 6 is a flowchart of an illustrative method of providing haptic feedback using an electronic device.

FIG. 6 is a flowchart of an illustrative method 600 that may, but need not necessarily, be implemented using the electronic device of FIGS. 1-3. The method 600 may alternatively be implemented using different electronic devices. Moreover, the electronic devices described herein may be used to implement different haptic feedback methods.

The method 600 begins, at 602, with receipt of a signal from a user interface of an electronic device, such as the eBook reader 100. The received signal designates a specific user input (e.g., highlight an object, turn a page, etc.), system event (e.g., a low batter alert, error message, etc.), program event (e.g., returning search results, specifying a beginning or end of playback, etc.), or other event.

At 604, the processing unit 204 or another program module 208 in memory 202 of the electronic device 100 compares the signal received from the user interface to a haptic profile 214 stored in memory of the electronic device 100. The haptic profile 214 specifies a haptic signature corresponding to the event designed by the received signal. In some instances, the haptic profile 214 (or another profile stored in memory) may also specify an audio file corresponding to the event designated by the received signal.

At 606, the haptic device driver 216 or a program module 208 in memory 202, determines a haptic signature, such as one of haptic signatures 402-408, to use in response to the received signal from the user interface, based on the comparison at 604.

At 608, the haptic device driver 216 drives the haptic feedback device 210 of the electronic device 100 to provide haptic feedback according to the haptic signature determined to be used. In the case of generating vibration haptic feedback, driving the haptic feedback device 210 may comprise sending a square wave signal with pulses having amplitude, duration, and/or patterns as specified in the haptic signature, to the haptic feedback device 210. The square wave signal has a base frequency corresponding to the peak resonant frequency of the haptic feedback device 210. Three different illustrative drive techniques that may be used to modulate the strength of the vibration generated by the haptic feedback device 210 are described below. However, other drive techniques may additionally or alternatively be used to drive the haptic feedback device 210.

The first technique is to generate the square wave pulse with a pulse-width-modulated (PWM) signal at a much higher frequency than the resonant frequency of the haptic feedback device 210. In this technique, modulation of the vibration strength is achieved by controlling the duty cycle of the PWM signal. The idea behind this method is to make use of "mechanical filtering" of the haptic feedback device 210. The haptic feedback device 210 does not react to the individual pulses of the PWM signal (because they are much higher than the haptic device's peak resonant frequency), but instead reacts to the average of all the pulses. Increasing or decreasing the duty cycle of the PWM signal changes the amount of energy delivered to the haptic device, thus affecting the strength of its vibration.

The second drive technique simply involves increasing or decreasing the amplitude of the square wave pulses, which correspondingly affects the strength of the haptic feedback device 210 vibration.

The third drive technique takes advantage of the roll-off from the peak resonance frequency that the haptic feedback device's mechanical vibration exhibits. By generating square wave pulses with larger or shorter widths than the ideal peak resonance width, the same effect of vibration strength modulation can be achieved.

With each of these drive techniques, pulses that create vibrations of different strengths can be strung together, one after another. This effectively creates unique tactile sensations that define the haptic signatures. Unique haptic signatures are mapped to events in the haptic profiles, as described above.

If, at 604, the haptic profile 214 or another profile stored in memory 202 specifies an audio file corresponding to the event designed by the received signal, at 610, the audio output 212 plays the audio file.

Then, at 612, the electronic device updates a display of the electronic device to reflect the received signal from the user interface. In the case of an electronic device with an electronic paper display or other display with a relatively long display update time, this update of the display occurs perceptibly after the haptic and/or audio feedback response. However, in electronic devices with CRT displays, LCDs, or other displays with relatively short display update times, the display may be updated substantially contemporaneously with the haptic and/or audio feedback response.

Certain acts in method 600 need not be performed in the order described, may be modified and/or may be omitted entirely, depending on the circumstances. For example, acts 610 and/or 612 may be omitted.

Moreover, any of the acts of any of the methods described herein may be implemented by a processor or other computing device based on instructions stored on one or more computer-readable media. Computer-readable media can include any available media that can be accessed by the electronic device. By way of example, and not limitation, computer-readable media may comprise volatile and nonvolatile, removable and non-removable media implemented in any method or technology for storage of information such as computer-readable instructions, data structures, program modules or other data. Some specific examples of computer-readable media include, without limitation, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can accessed by the electronic device. Combinations of the any of the above should also be included within the scope of computer-readable media.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A portable electronic book reader device comprising:
   a housing;
   an electronic paper display screen disposed in the housing, the electronic paper display screen having a display update time;
   a user interface coupled to the housing and configured to receive user input to be rendered on the display; and
   a haptic feedback device coupled to the housing and configured to provide haptic feedback in response to receipt of input to the user interface, the haptic feedback device having a response time that is less than the display update time.

2. The portable electronic book reader device of claim 1, further comprising:
   memory storing a plurality of haptic profiles, each haptic profile defining a haptic signature to be used in response to a given user input event; and
   a haptic feedback device driver configured to drive the haptic feedback device to provide haptic feedback according to one of the plurality of haptic profiles.

3. The portable electronic book reader device of claim 2, wherein the haptic feedback device comprises an electric field generator and a magnetic mass, the electric field generator being actuatable to drive the mass to generate a vibration.

4. An electronic device comprising:
   a display having a display update time;
   a user interface configured to receive user input; and
   a haptic feedback device configured to provide haptic feedback in response to user input received at the user interface, the haptic feedback device having a responsiveness that is faster than the display update time of the display.

5. The electronic device of claim 4, wherein the display comprises an electronic paper display.

6. The electronic device of claim 4, wherein the display has a display update time greater than about 15 milliseconds, and wherein the haptic feedback device has a response time of at most about 15 milliseconds.

7. The electronic device of claim 4, wherein the haptic feedback device is configured to provide haptic feedback in response to one or more of the following user inputs:
   user input to highlight an object on the display;
   user input to select an object on the display;
   user input to turn a page presented on the display;
   user input to open a menu on the display;
   user input to delete an item from memory of the device;
   user input invoking a search function;
   user input to clip text on the display; and
   user input to activate a link on the display.

8. The electronic device of claim 4, further comprising memory storing a plurality of haptic profiles, each haptic profile defining a haptic signature to be used in response to a given user input.

9. The electronic device of claim 8, wherein each haptic signature defines a duration, amplitude, and pattern of haptic feedback provided.

10. The electronic device of claim 8, further comprising a haptic feedback device driver configured to drive the haptic feedback device to provide haptic feedback according to one of the plurality of haptic profiles.

11. The electronic device of claim 4, wherein the haptic feedback device is configured to provide haptic feedback according to one or more haptic profiles.

12. The electronic device of claim 4, wherein the haptic feedback device is configured to provide one or more of the following forms of feedback: vibration feedback, force feedback, motion feedback.

13. The electronic device of claim 4, wherein the haptic feedback device comprises an electric field generator and a magnetic mass, the electric field generator being selectively activatable to drive the mass to generate a vibration.

14. The electronic device of claim 4, wherein the haptic feedback device comprises an unbalanced rotatable mass and a motor to drive the unbalanced rotatable mass.

15. The electronic device of claim 4, wherein the haptic feedback device comprises a piezoelectric actuator.

16. The electronic device of claim 4, wherein the haptic feedback device comprises a shape memory alloy or a shape memory polymer.

17. The electronic device of claim 4, wherein the haptic feedback device is fixed to a housing of the electronic device to impart the haptic feedback to the housing.

18. The electronic device of claim 4, wherein the haptic feedback device is coupled to a particular user input device of the user interface, such that the haptic feedback is localized to the particular user input device.

19. The electronic device of claim 18, wherein the haptic feedback device is coupled to a joystick of the electronic device to provide localized haptic feedback to the joystick.

20. The electronic device of claim 18, further comprising an audio output device configured to output a sound in response to received user input.

21. One or more computer-readable media storing computer-executable instructions that, when executed, are configured to perform acts comprising:
   receiving a signal from a user interface of an electronic device, the signal designating a specific user input;
   comparing the signal received from the user interface to a haptic profile stored in memory of the electronic device, the haptic profile comprising a haptic signature corresponding to the signal received from the user interface;
   determining the haptic signature to use in response to the received signal from the user interface, based on the comparison; and
   driving a haptic feedback device of the electronic device to provide haptic feedback according to the haptic signature determined to be used.

22. The one or more computer-readable media of claim 21, wherein the haptic signature defines a duration, amplitude, and pattern of haptic feedback provided.

23. The one or more computer-readable media of claim 21, storing instructions configured to perform the further act of updating a display of the electronic device based on the signal received from the user interface, wherein the haptic feedback mechanism has a shorter response rate than a display update time of the display, such that driving the haptic feedback mechanism is configured to occur prior to updating the display.

24. The one or more computer-readable media of claim 21, wherein the received signal designates one or more of the following user inputs:
   user input to highlight an object on the display;
   user input to select an object on the display;
   user input to turn a page presented on the display;
   user input to open a menu on the display;
   user input to delete an item from memory of the device;
   user input invoking a search function;
   user input to clip text on the display; and
   user input to activate a link on the display.

25. The one or more computer-readable media of claim 21, storing instructions configured to perform the further act of outputting a sound based on the signal received from the user interface.

* * * * *